United States Patent [19]

Hermann et al.

[11] 4,211,716
[45] Jul. 8, 1980

[54] PROCESS FOR ISOLATING TRIARYLMETHANE DYESTUFFS

[75] Inventors: Karl H. Hermann, Leverkusen; Hans-Lothar Dorsch, Cologne, both of Fed. Rep. of Germany

[73] Assignee: Bayer Aktiengesellschaft, Leverkusen, Fed. Rep. of Germany

[21] Appl. No.: 909,190

[22] Filed: May 24, 1978

[30] Foreign Application Priority Data

May 26, 1977 [DE] Fed. Rep. of Germany ....... 2723774

[51] Int. Cl.$^2$ ...................... C09B 11/10; C09B 11/22
[52] U.S. Cl. ..................................... 260/391; 260/392
[58] Field of Search ..................... 260/705, 391, 392

[56] References Cited

U.S. PATENT DOCUMENTS

| | | | |
|---|---|---|---|
| 2,181,369 | 11/1939 | Frank | 260/391 |
| 3,422,445 | 6/1947 | Stryker et al. | 260/391 X |
| 3,652,602 | 3/1972 | Schafer et al. | 260/392 X |
| 3,686,233 | 8/1972 | Gordon et al. | 260/391 |

FOREIGN PATENT DOCUMENTS

| | | | |
|---|---|---|---|
| 529210 | 11/1940 | United Kingdom | 260/705 |
| 872561 | 7/1961 | United Kingdom | 260/391 |

*Primary Examiner*—Patrick Garvin
*Assistant Examiner*—Raymond K. Covington
*Attorney, Agent, or Firm*—Sprung, Felfe, Horn, Lynch & Kramer

[57] ABSTRACT

Dyestuffs of the formula

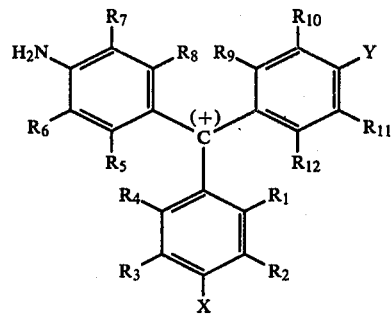

wherein
$R_1$-$R_2$ denote hydrogen, alkyl, halogenoalkyl, halogen, alkoxy, alkylmercapto, alkylsulfphonyl, alkoxysulphonyl, alkylcarbonyl, alkoxycarbonyl, nitro or cyano,
X and Y denote

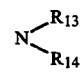

and
$R_{13}$ and $R_{14}$ denote hydrogen, alkyl, halogenoalkyl, cyanoalkyl, cycloalkyl, aryl or aralkyl,
and wherein
X and $R_2$, Y and $R_{10}$, $R_1$ and $R_2$, $R_5$ and $R_6$, and $R_9$ and
$R_{10}$ can form a 5-membered or 6-membered ring and $A^{(-)}$ denotes an anion,
can be obtained in excellent purity when the hot reaction melts obtained by known processes are introduced into a two-phase system consisting of water and an organic solvent which is not water-miscible or which is water-miscible to a limited extent, and the dyestuffs are separated off.

8 Claims, No Drawings

PROCESS FOR ISOLATING TRIARYLMETHANE DYESTUFFS

The invention relates to a process for isolating dyestuffs of the general formula

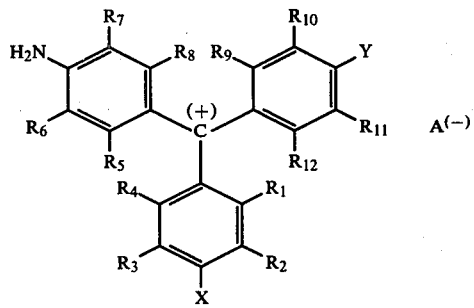

wherein
$R_1$–$R_{12}$ independently of one another denote hydrogen, alkyl, halogenoalkyl, halogen, alkoxy, alkylmercapto, alkylsulphonyl, alkoxysulphonyl, alkylcarbonyl, alkoxycarbonyl, nitro or cyano,
X and Y independently of one another denote

and
$R_{13}$ and $R_{14}$ independently of one another denote hydrogen, alkyl, halogenoalkyl, cyanaoalkyl, cycloalkyl, aryl or aralkyl,
and wherein
X and $R_2$, Y and $R_{10}$, $R_1$ and $R_2$, $R_5$ and $R_6$, and $R_9$ and
$R_{10}$ can form a 5-membered or 6-membered ring and $A^{(-)}$ denotes an anion,
in a tinctorially pure and technically pure form.

The process consists in introducing crude hot reaction melts obtained by known processes, if appropriate after distilling off some of the starting compounds not converted in the reaction, into a two-phase system consisting of water and an organic solvent which is not water-miscible or which is water-miscible only to a limited extent, and separating off the dyestuff.

In formula (I), alkyl radicals are to be understood, in particular, as $C_1$–$C_4$-alkyl radicals. The alkyl radicals carry, for example, 1–3 of the given substituents.

Halogen is to be understood, preferably, as fluorine, chlorine or bromine.

Suitable cycloalkyl radicals are, in particular, an optionally substituted cyclopentyl or cyclohexyl radical.

Suitable aryl radicals are, in particular, an optionally substituted phenyl or naphthyl radical.

Suitable aralkyl radicals are, in particular, an optionally substituted benzyl or β-phenylethyl radical.

These isocyclic radicals can carry, for example, 1–3 substituents, such as halogen, $C_1$–$C_4$-alkyl or $C_1$–$C_4$-alkoxy.

The substituents X and $R_2$, and Y and $R_{10}$, together with the benzene ring, form, for example, a tetrahydroquinoline or indoline ring, and the substituents $R_1$ and $R_2$, $R_5$ and $R_6$, and $R_9$ and $R_{10}$, together with the benzene ring, form, for example, a naphthalene ring.

A group of dyestuffs which can preferably be prepared by the new process are those of the formula (I) in which the substituents $R_1$, $R_4$, $R_5$, $R_8$, $R_9$, $R_{12}$, $R_{13}$ and $R_{14}$ represent hydrogen.

From this group, in turn, those in which substituents $R_2$, $R_6$ and $R_{10}$ also represent hydrogen and in which substituents $R_3$, $R_7$ and $R_{11}$ denote hydrogen or $C_1$–$C_4$-alkyl, in particular methyl, are to be singled out.

The anion is determined by the preparation process. In general, the dyestuffs are in the form of halides, in particular in the form of chlorides or bromides. The anions can be replaced by other anions in a known manner.

By an organic solvent which is not water-miscible or which is water-miscible to a limited extent there are understood, in particular, those having a solubility in water of up to 5%. Mixtures thereof can also be used.

Examples which may be mentioned are: saturated and unsaturated aliphatic hydrocarbons, in particular those with 4–12 C atoms, such as hexane, octane, isooctane, dodecane or hexene; cycloaliphatic hydrocarbons, in particular cyclopentane, cyclohexane or decalin or derivatives thereof substituted by 1–3 $C_1$–$C_4$-alkyl radicals; aromatic and fused aromatic-cycloaliphatic hydrocarbons, in particular benzene, naphthalene or tetralin or derivatives thereof substituted by 1–3 $C_1$–$C_{12}$-alkyl radicals, such as toluene, xylene, ethylbenzene, diethylbenzene, cumene, diisopropylbenzene, trimethylbenzene, butylbenzene, dodecylbenzene, biphenyl or methylnaphthalene; halogenohydrocarbons, which are preferably derived from saturated or unsaturated hydrocarbons with 1–4 carbon atoms or from the abovementioned aromatic or cycloaliphatic hydrocarbons and which can be substituted, for example, by 1–4 halogen atoms, such as chlorine or bromine, for example carbon tetrachloride, chloroform, methylene chloride, dichloroethylene, dichloroethane, perchloroethylene, tetrachloroethane, chlorobenzene, dichlorobenzene, chlorotoluene, bromobenzene, dibromobenzene, bromotoluene or chloronaphthalene; ethers, which can be symmetric or asymmetric, open-chain or cyclic and which are derived, in particular, from the abovementioned hydrocarbons, such as anisole, phenetole, di-n-hexyl ether or diphenyl ether; and alcohols, in particular those which are derived from the abovementioned aliphatic hydrocarbons, such as hexanol, octanol and dodecanol.

The triarylmethane dyestuffs of the formula (I) are synthesised in a known manner by reaction of 2 or 3 mols of aromatic amines, which can be identical or different and have the formula

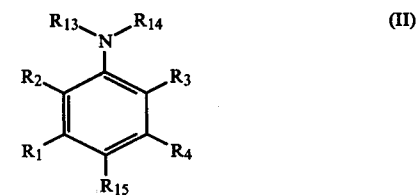

in which
$R_1$–$R_4$, $R_{13}$ and $R_{14}$ have the meaning indicated above and
$R_{15}$ represents hydrogen, methyl, halogenomethyl with
1–3 halogen atoms, hydroxymethyl, formyl or the groups

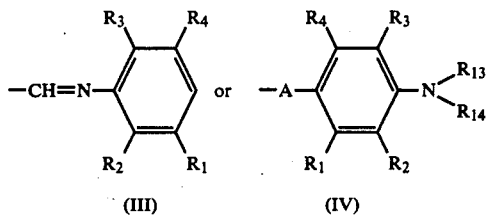

wherein

A can be CO, $CH_2$ or $CH-R_{16}$ and $R_{16}$ denotes hydroxyl, $C_1-C_4$-alkoxy, amino, mono- or di-$C_1-C_4$-alkylamino or halogen, in the presence of an oxidising agent and an oxidation catalyst at temperatures between 110° and 190° over a period of between 4 and 24 hours, and under catalysis by mineral acids or Lewis acids.

When choosing the amines, it must be taken into account that in order to provide the central C atom of the triarylmethane dyestuffs, either $R_{15}$ must be other than hydrogen in one mol of amine or, if $R_{15}$ is hydrogen for all the amines, one mol of a substance which provides the central C atom must be added. Methanol, formaldehyde, formic acid, mono-, di, tri- and tetra-halogenomethane or the N-methylene, N-formyl, N-methyl or N,N-dimethyl derivatives of the above-mentioned amines, which under the oxidising reaction conditions split off molecules which are capable of being incorporated into the triarylmethane skeleton, are predominantly used for this purpose. Furthermore, the reaction mixture should be composed such that $R_{15}$ differs from hydrogen in at most one mol of amine. If $R_{15}$ in one mol of amine is one of the groupings III or IV, only a second mol of amine of the above-mentioned formula need be added. In the case of all other radicals $R_{15}$, a total of 3 mols of amine are employed in the melt.

Catalysts which can be used are either mineral acids, such as hydrochloric acid, hydrobromic acid, phosphoric acid or sulphuric acid, or Lewis acids, such as $ZnCl_2$, $BF_3$ $CdCl_2$, $AlCl_3$ or $MnCl_2$.

Examples of suitable oxidising agents are aromatic nitro compounds, preferably those of the formula

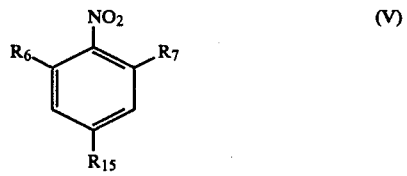

in which $R_6$, $R_7$ and $R_{15}$ have the abovementioned meaning. These compounds have the advantage that on reduction they are converted into amines which are suitable for incorporation into the triarylmethane skeleton. Further suitable oxidising agents are arsenic acid, antimonic acid, manganese dioxide, chloranil or air.

Oxidation catalysts which can be employed are $FeCl_2$, $Fe_2O_3$, CuO, ammonium metavanadate or the cobalt complex of the azomethine obtained from 1,2-diaminoethane and 2 mols of salicylaldehyde.

These customary syntheses of the triarylmethane dyestuffs are known, for example, from: J. T. Scanlan, J. Am. Chem. Soc. 57 (1935) page 887 and 58 (1936) page 1,427, Fiat 1,313, II, page 330, U.S. Pat. No. 2,542,544 and German Patent Specification Nos. 7,991, 16,766, 19,484, 59,775, 61,146, 66,125, 67,013, 93,540, 270,930 and 397,823.

All these reactions lead to a number of by-products, such as yellow acridine and phenazine dyestuffs or more highly condensed brown to black compounds, which must be separated off during the isolation of the triarylmethane dyestuffs.

Since the properties of the by-products are very similar to those of the triarylmethane dyestuffs, the by-products can be separated off only with great difficulty.

The purification process used hitherto is carried out by distilling off non-condensed amines and nitro compounds with steam or, if the reaction mixture contains no nitro compounds, by dissolving the amines in dilute aqueous acid and separating off the remaining components of the reaction mixture by filtration. The triarylmethane dyestuff is then extracted from the residue at temperatures between 20° and 100° C., using acids. During this extraction, some of the yellow and brown by-products formed also dissolve and some remain undissolved and are separated off by filtration. Depending on the volume and temperature, the pH value of the extraction solution is between 0.1 and 7. The dyestuff is isolated from the extraction solution by cooling the solution, increasing the pH value by means of bases or adding sodium chloride, or by applying a combination of the three operations just mentioned.

Even after further conventional purification methods, such as recrystallisation, using this method of isolation, it is not possible to obtain the triarylmethanes in sufficient yield and free from by-products which shift the colour shade to yellower and duller shades.

It has now been found, surprisingly, that the triarylmethane dyestuffs can be isolated in high yield and free from yellow and dark, dulling by-products when the hot reaction melts obtained by the known processes just described are introduced, if appropriate after distilling off some of the unreacted starting materials, into a two-phase system, warmed to 0°-80° C., preferably 20°-60° C., which consists, relative to the melt volume, of 100-1,000, preferably 200-500, percent by volume of water and, relative to the water volume, of 0.2-200, preferably 10-100, percent by volume of an organic solvent which is not water-miscible or which is water-miscible only to a limited extent. A pH value of 0.5-7, preferably 1-4, is thereby obtained by adding acid, in particular hydrochloric acid. After a constant pH value has been set up, the dyestuff is isolated from the aqueous phase. It is thereby obtained in the crystalline form.

The dyeings from the triarylmethane dyestuffs isolated in this manner are clearer and bluer than those from the dyestuffs purified in the conventional manner. The purification process according to the invention is important industrially, since in contrast to all purification processes known hitherto, it is possible, in one operation, to separate off the dyestuff from all the starting materials and by-products present in the melts and to isolate it in a pure form. The purification effect achieved in this manner is unusual and surprising since the yellow and brown to black by-products separated off are insoluble or only slightly soluble in the organic phase; they are found in the aqueous phase of the filtrate in a concentration which is far higher than that found with the procedure without organic solvents.

The parts indicated in the examples are parts by weight.

EXAMPLE 1

262 parts of a melt obtained according to a process described by J. T. Scanlan, J. Am. Chem. Soc. 57 (1935) page 887–892, by melting 56 parts of o-toluidine, 75 parts of o-toluidine hydrochloride, 36 parts of as-m-xylidine, 82 parts of o-nitrotoluene and 12 parts of iron chloride are added dropwise to a system consisting of 1,000 parts of water and 500 parts of chlorobenzene and having a temperature of 20° C. During the dropwise addition and subsequent stirring, the pH value is adjusted to 2.0 with hydrochloric acid. After stirring for 6 hours, filtering off and washing the precipitate gives 75 parts of a dyestuff of the formula

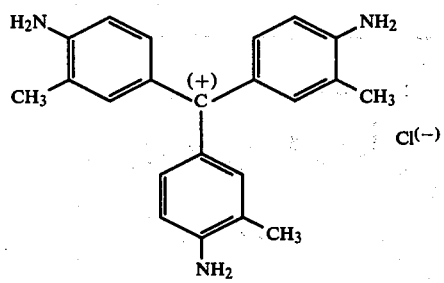

which is free from yellow or dulling impurities and gives particularly clear, red-violet dyeings on polyacrylonitrile and acid-modified polyester fibres.

EXAMPLE 2

According to the literature reference indicated in Example 1, 239 parts of a mixture obtained by melting 49 parts of aniline, 68 parts of aniline hydrochloride, 36 parts of as-m-xylidine, 74 parts of nitrobenzene and 12 parts of iron-II chloride are worked up as described above.

This gives 19 parts of a dyestuff of the formula

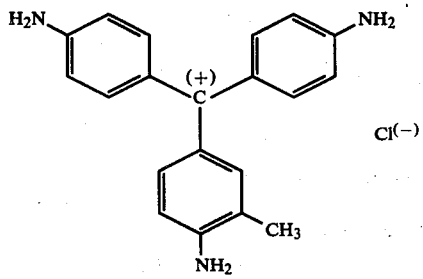

of outstanding quality. It dyes polyacrylonitrile fibres and acid-modified polyester fibres in clearer and bluer shades than the product isolated without chlorobenzene.

The dyestuffs indicated in the table which follows can be obtained in good quality by varying the starting materials.

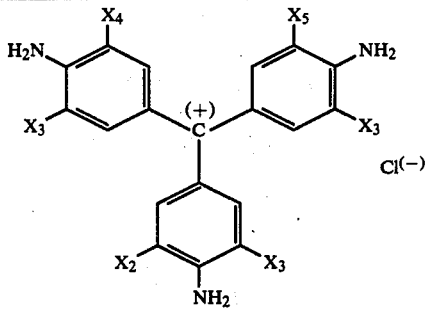

| $X_1$ | $X_2$ | $X_3$ | $X_4$ | $X_5$ | $X_6$ |
|---|---|---|---|---|---|
| $CH_3$ | $CH_3$ | H | H | H | H |
| H | H | H | H | H | H |
| $C_2H_5$ | $C_2H_5$ | $C_2H_5$ | H | H | H |
| $C_2H_4$—Cl | H | H | H | H | H |
| Br | H | H | H | H | H |
| $CH_3$ | $CH_3$ | $CH_3$ | $CH_3$ | H | H |
| $CH_3$ | $CH_3$ | $CH_3$ | $CH_3$ | $CH_3$ | H |
| $C_4H_9$ | H | H | H | H | H |
| $OCH_3$ | H | H | H | H | H |

EXAMPLE 3

Melting 28 parts of aniline, 49 parts of a toluidine mixture (24% of p-, 74% of o- and 2% of -mtoluidine), 3 parts of p-toluidine, 43 parts of a nitrotoluene mixture (24% of p-, 74% of o- and 2% of m-nitrotoluene), 2.5 parts of p-nitrotoluene, 26.3 parts of zinc chloride and 26.5 parts of iron-II chloride according to Fiat 1,313 II, page 330, gives 170 parts of a melt, which are added dropwise to a system consisting of 800 parts of water and 400 parts of chlorobenzene. During the dropwise addition phase and the subsequent stirring phase, the pH value is kept at 1.8 by metering in hydrochloric acid. After stirring for 6 hours, the precipitate is filtered off and washed twice with 100 parts of water. This gives 50 parts of the dyestuff of the formula

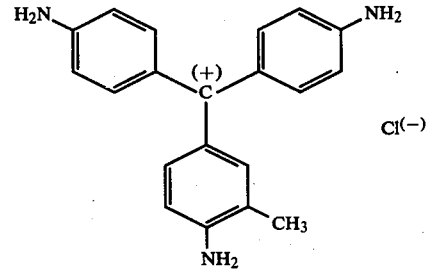

the quality of which is so good that a further purification step is not necessary.

EXAMPLE 4

850 parts of a hot melt are obtained, as in German Patent Specification No. 59,775, by melting 100 parts of anhydroformaldehyde o-toluidine 500 parts of o-toluidine hydrochloride, 100 parts of o-toluidine, 120 parts of o-nitrotoluene, 10 parts of iron and 30 parts of iron chloride and are added dropwise to a two-phase system consisting of 2,000 parts of water and 1,000 parts of chlorobenzene. The pH value is adjusted to 2.0 by adding hydrochloric acid. After stirring for 10 hours, the precipitate is filtered off and washed twice with 300 parts of water. This gives 210 parts of a dyestuff of the formula

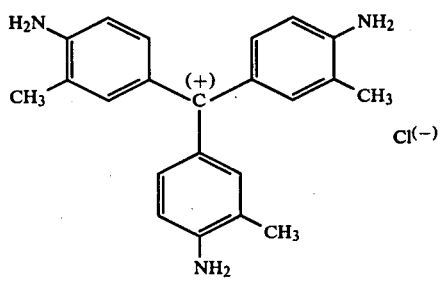

of outstanding quality.

EXAMPLE 5

According to U.S. Pat. No. 2,542,544, 70 parts of concentrated hydrochloric acid are added to 300 parts of aniline and the mixture is then dehydrated. After adding 20.5 parts of p-toluidine, 0.15 part of a catalyst which is formed by heating sodium metavanadate in acetic anhydride is added. Thereafter, dry air is passed through the reaction mixture at 110°–118° C.

After 20 hours, some of the unreacted amines are distilled off in vacuo. The melt which remains is added dropwise to a system consisting of 500 parts of water and 250 parts of chlorobenzene, a pH value of 2.0 being maintained. After stirring for 6 hours, the pH value remains constant and filtering off and washing the precipitate gives 36 parts of dyestuff of the formula

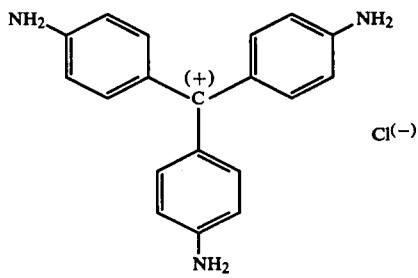

The dyestuff is of outstanding quality and dyes polyacrylonitrile fibres and acid-modified polyester fibres in very clear red-violet shades.

EXAMPLE 6

205.5 parts of a melt obtained, according to the process from the literature reference quoted in Example 1, by heating 45 parts of 3,3'-dimethyl-4,4'-diaminodiphenylmethane, 107 parts of o-toluidine, 21.5 parts of o-toluidine hydrochloride, 22 parts of o-nitrotoluene and 10 parts of iron-II chloride are added dropwise to a system consisting of 600 parts of water and 300 parts of chlorobenzene. The pH value is kept at 2.2. After stirring for 10 hours, the precipitate is filtered off and washed twice with water. This gives 20 parts of a dyestuff of the formula

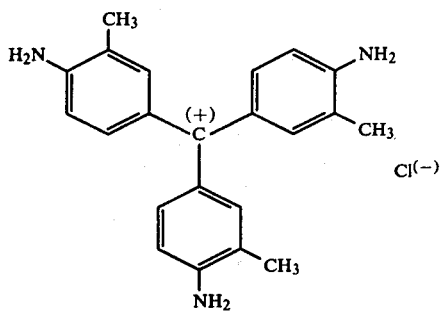

which dyes polyacrylonitrile fibres and acid-modified polyester fibres in very clear red-violet shades.

The dyestuffs indicated in the table which follows can be obtained in good quality by varying the starting materials.

| $X_1$ | $X_3$ | $X_5$ | A | B |
|---|---|---|---|---|
| H | H | H | $N(CH_3)_2$ | $N(CH_3)_2$ |
| $CH_3$ | $CH_3$ | $CH_3$ | $N(CH_3)_2$ | $N(CH_3)_2$ |
| $CH_3$ | H | H | $N(C_2H_5)_2$ | $N(C_2H_5)_2$ |
| $CF_3$ | H | H | $NH-CH_3$ | $NH-CH_3$ |
| H | H | H | $NH-C_6H_5$ | $NH-C_6H_5$ |
| H | H | H | $N(C_2H_4-Cl)_2$ | $N(C_2H_4-Cl)_2$ |
| H | H | H | $NH_2$ | $NH_2$ |

EXAMPLES 7–12

The procedure followed is as in Examples 1–6, except that instead of chlorobenzene the same amount of o-dichlorobenzene is employed. The dyestuffs, which are isolated in similarly good yields, are of the same good quality.

EXAMPLES 13–19

The procedure followed is as in Examples 1–6, except that the chlorobenzene is replaced by the same amount of 1,2-dichloroethane. The dyestuffs, which are obtained in good yields, are of the same good quality.

EXAMPLES 19–24

Similar results to those in Examples 1–6 are obtained when the chlorobenzene is replaced by the same amount of carbon tetrachloride.

EXAMPLES 25–30

If in the processes described in Examples 1–6 the chlorobenzene is replaced by the same amount of toluene, products of the same good quality are obtained in similarly good yields.

We claim:

1. In a process for preparing and isolating a dyestuff of the formula

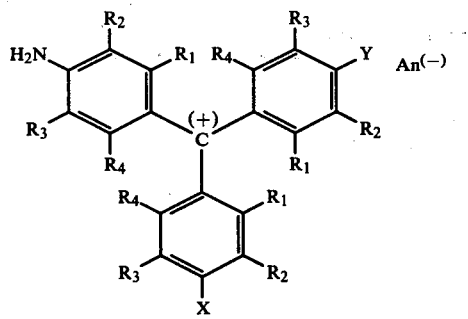

in which

R$_1$, R$_2$, R$_3$, and R$_4$, independently of each other, are hydrogen, alkyl, halogenoalkyl, halogen, alkoxy, alkylmercapto, alkylsulphonyl, alkoxysulphonyl, alkylcarbonyl, alkoxycarbonyl, nitro, or cyano;

X and Y, independently of each other, are

R$_5$ and R$_6$, independently of each other, are hydrogen, alkyl, halogenoalkyl, cyanoalkyl, cycloalkyl, aryl, or aralkyl;

the adjacent substitutents

X and R$_2$, Y and R$_2$, NH$_2$ and R$_2$, and R$_1$ and R$_2$, in addition to the above definitions are, a 5-membered or 6-membered ring; and A$^{(-)}$ is an anion;

said dyestuff being prepared by the reaction of 2 or 3 mols of identical or different amines of the formula

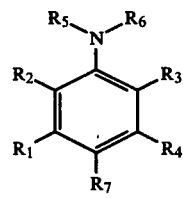

in which

R$_1$, R$_2$, R$_3$, R$_4$, R$_5$, and R$_6$ have the meaning indicated above and R$_7$ is hydrogen, methyl, halogenomethyl with 1-3 halogen atoms, hydroxymethyl, formyl,

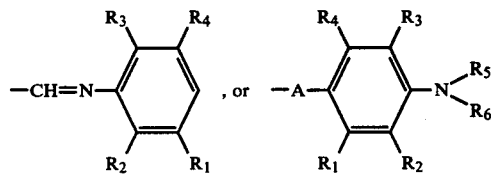

wherein

A is CO, CH$_2$ or CH-R$_8$; and

R$_8$ is hydroxyl, C$_1$-C$_4$-alkoxy, amino, mono- or di-C$_1$-C$_4$-alkylamino, or halogen;

in the presence of an oxidizing agent and an oxidation catalyst at temperatures between 110° C. and 190° C. over a period of 4 to 24 hours, and under catalysis by mineral acids or Lewis acids, whereby the central C atom or the triarylmethane dyestuff is provided either by R$_7$ or one mol of an additional substance which provides the central C atom; the improvement in the isolation process comprising introducing the hot reaction melts obtained by this process at 0°–80° C. into a two-phase system consisting of water and an organic solvent, which is water-immiscible or is barely water-miscible and separating the dyestuff in a purified form.

2. Process according to claim 1 for isolating dyestuffs of the formula

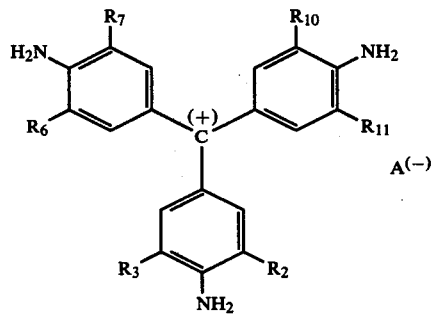

wherein

R$_2$, R$_3$, R$_6$, R$_7$, R$_{10}$, R$_{11}$ and A$^{(-)}$ have the meaning indicated in claim 1.

3. Process according to claim 1 for isolating dyestuffs of the formula

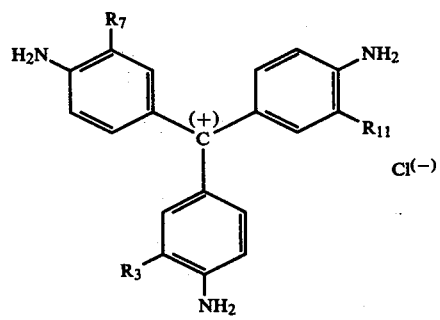

wherein

R$_3$, R$_7$ and R$_{11}$ denote hydrogen or C$_1$-C$_4$-alkyl.

4. Process according to claim 1, characterised in that some of the unreacted starting compounds are removed from the reaction melts by distillation before introducing the melts into the two-phase system.

5. Process according to claim 1, characterised in that the organic solvent employed is a saturated or unsaturated aliphatic hydrocarbon, a cycloaliphatic, aromatic or fused aromatic-cycloaliphatic hydrocarbon, a saturated or unsaturated aliphatic or aromatic halogenohydrocarbon, an aliphatic, aromatic or aliphatic-aromatic ether or an aliphatic alcohol or mixtures thereof.

6. Process according to claim 1, characterised in that the organic solvent employed is a saturated or unsaturated aliphatic halogenohydrocarbon with 1–4-C atoms and 1–4 halogen atoms, in particular chlorine atoms, or a halogenobenzene with 1–4 halogen atoms, in particular chlorine atoms, and optionally 1–4 $C_1$–$C_{12}$-alkyl radicals.

7. Process according to claim 1, characterised in that the organic solvent employed is 1,2-dichloroethane, carbon tetrachloride, chlorobenzene, chlorotoluene or o-dichlorobenzene.

8. Process according to claim 1, characterised in that the hot reaction melts obtained by known processes are introduced into a two-phase system, warmed to 0°–80° C., consisting of, relative to the melt volume, 100–1,000 percent by volume of water and, relative to the water volume, 0.2–200 percent by volume of an organic solvent which is not water-miscible or which is water-miscible only to a limited extent, a pH value of 0.5 to 7 being maintained, and, after a constant pH value has been set up, the dyestuff is separated off.

* * * * *